US008851977B2

(12) United States Patent
Loose et al.

(10) Patent No.: US 8,851,977 B2
(45) Date of Patent: Oct. 7, 2014

(54) DUAL LIQUID CRYSTAL SHUTTER DISPLAY

(75) Inventors: Timothy C. Loose, Chicago, IL (US); James M. Rasmussen, Chicago, IL (US)

(73) Assignee: WMS Gaming Inc.

( * ) Notice: Subject to any disclaimer, the term of this patent is extended or adjusted under 35 U.S.C. 154(b) by 204 days.

(21) Appl. No.: 13/499,137

(22) PCT Filed: Sep. 22, 2010

(86) PCT No.: PCT/US2010/049834

§ 371 (c)(1), (2), (4) Date: Mar. 29, 2012

(87) PCT Pub. No.: WO2011/041185

PCT Pub. Date: Apr. 7, 2011

(65) Prior Publication Data

US 2012/0184364 A1 Jul. 19, 2012

Related U.S. Application Data

(60) Provisional application No. 61/246,800, filed on Sep. 29, 2009.

(51) Int. Cl.
*A63F 13/00* (2014.01)
*A63F 9/24* (2006.01)
*G07F 17/32* (2006.01)
*G07F 17/34* (2006.01)

(52) U.S. Cl.
CPC ............ *G07F 17/3211* (2013.01); *G07F 17/32* (2013.01); *G07F 17/34* (2013.01); *G07F 17/3216* (2013.01)
USPC .................................. 463/25; 463/34; 353/88

(58) Field of Classification Search
USPC ................................................ 463/25, 30, 31
See application file for complete search history.

(56) References Cited

U.S. PATENT DOCUMENTS

| | | | | |
|---|---|---|---|---|
| 5,647,036 | A * | 7/1997 | Deacon et al. | 385/27 |
| 5,655,965 | A * | 8/1997 | Takemoto et al. | 463/20 |
| 5,913,727 | A * | 6/1999 | Ahdoot | 463/39 |
| 5,954,414 | A * | 9/1999 | Tsao | 353/7 |
| 6,314,248 | B1 * | 11/2001 | Ohmura et al. | 396/429 |
| 6,517,433 | B2 * | 2/2003 | Loose et al. | 463/20 |
| 6,703,988 | B1 * | 3/2004 | Fergason | 345/6 |
| 7,134,079 | B2 | 11/2006 | Brown et al. | |

(Continued)

FOREIGN PATENT DOCUMENTS

| | | | | |
|---|---|---|---|---|
| JP | 2002101427 A * | 4/2002 | ............. | H04N 13/04 |

*Primary Examiner* — William Brewster
*Assistant Examiner* — Jason Skaarup
(74) *Attorney, Agent, or Firm* — Nixon Peabody LLP

(57) ABSTRACT

A dual switchable LCD display is disclosed that allows the juxtaposition of a front and rear image. A rear switchable screen is in proximity to the projector system. The rear image is projected on the rear screen at a first time interval. The rear switchable screen has an open state allowing light transmission through the rear screen and a closed translucent state obscuring the rear screen. A front switchable screen overlays the rear switchable screen. The projector system projects the front image on the front screen at a second time interval. The front switchable screen has an open state allowing light transmission through the front screen and a closed translucent state obscuring the front screen. A controller periodically cycles the respective closed and open states between the first and second time intervals to present a juxtaposition of the front image and the rear image to a viewer.

20 Claims, 8 Drawing Sheets

(56) References Cited

U.S. PATENT DOCUMENTS

| | | | | |
|---|---|---|---|---|
| 7,220,181 | B2 * | 5/2007 | Okada | 463/32 |
| 7,309,284 | B2 | 12/2007 | Griswold et al. | |
| 7,329,181 | B2 * | 2/2008 | Hoshino et al. | 463/20 |
| 7,335,101 | B1 * | 2/2008 | Luciano, Jr. | 463/16 |
| 7,452,276 | B2 * | 11/2008 | Loose et al. | 463/31 |
| 7,458,890 | B2 * | 12/2008 | Loose et al. | 463/16 |
| 7,510,476 | B2 * | 3/2009 | Kobayashi | 463/31 |
| 7,594,852 | B2 * | 9/2009 | Rasmussen | 463/20 |
| 7,841,944 | B2 * | 11/2010 | Wells | 463/37 |
| 7,878,903 | B2 * | 2/2011 | Chan | 463/31 |
| 7,878,910 | B2 * | 2/2011 | Wells | 463/46 |
| 2001/0031658 | A1 * | 10/2001 | Ozaki et al. | 463/16 |
| 2004/0029636 | A1 * | 2/2004 | Wells | 463/32 |
| 2004/0198485 | A1 * | 10/2004 | Loose et al. | 463/20 |
| 2004/0214637 | A1 * | 10/2004 | Nonaka | 463/31 |
| 2004/0219968 | A1 * | 11/2004 | Fiden et al. | 463/20 |
| 2005/0020360 | A1 * | 1/2005 | Hosaka | 463/31 |
| 2005/0059487 | A1 * | 3/2005 | Wilder et al. | 463/32 |
| 2005/0153775 | A1 * | 7/2005 | Griswold et al. | 463/30 |
| 2005/0255908 | A1 * | 11/2005 | Wells | 463/20 |
| 2007/0004513 | A1 * | 1/2007 | Wells et al. | 463/31 |
| 2008/0004104 | A1 * | 1/2008 | Durham et al. | 463/20 |
| 2008/0020816 | A1 * | 1/2008 | Griswold et al. | 463/16 |
| 2008/0020840 | A1 | 1/2008 | Wells et al. | |
| 2008/0096655 | A1 * | 4/2008 | Rasmussen et al. | 463/31 |
| 2008/0113755 | A1 * | 5/2008 | Rasmussen et al. | 463/20 |
| 2008/0119288 | A1 * | 5/2008 | Rasmussen | 463/46 |
| 2008/0188283 | A1 * | 8/2008 | Okada | 463/20 |
| 2008/0207303 | A1 * | 8/2008 | Rasmussen | 463/20 |
| 2009/0036208 | A1 * | 2/2009 | Pennington et al. | 463/33 |
| 2009/0075721 | A1 * | 3/2009 | Pacey et al. | 463/20 |
| 2009/0131145 | A1 * | 5/2009 | Aoki et al. | 463/20 |
| 2010/0081502 | A1 * | 4/2010 | Rasmussen et al. | 463/30 |
| 2010/0141856 | A1 * | 6/2010 | Schuck et al. | 349/9 |
| 2012/0270648 | A1 * | 10/2012 | Rasmussen et al. | 463/30 |
| 2013/0130774 | A1 * | 5/2013 | Williams et al. | 463/20 |

* cited by examiner

DUAL LIQUID CRYSTAL SHUTTER DISPLAY

PRIORITY CLAIM AND CROSS REFERENCE TO RELATED APPLICATIONS

This application is a U.S. national stage of International Application No. PCT/US2010/049834 filed on Sep. 22, 2010, which is related to and claims priority to U.S. Provisional Application No. 61/246,800, filed on Sep. 29, 2009, each of which is incorporated herein its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to switchable transmissive displays and more particularly relates to a transmissive display having dual liquid crystal shutter screens that allows display of two juxtaposed images.

BACKGROUND

Gaming terminals, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

LCDs (liquid crystal displays) have long been incorporated into gaming machines to enhance the flexibility of the displayed wagering games. However, some players prefer to see mechanical reels rather than a video rendering of a slot machine game, in part due to the more traditional appearance and perceived trustworthiness of the rotating mechanical slot reels. Utilization of mechanical reels makes the wagering game more enjoyable for such players, but limits the ability of the wagering game machine to present computer graphics and animation to enhance the theme of the wagering game or to provide other information, and so may be less entertaining to players than a wagering game utilizing a touchscreen LCD wagering game system.

Video-based slot machines allow for flexibility in game design and do not require any additional hardware for implementing different games, such as bonus games. With respect to flexibility in game design, the video display of a video-based slot machine can depict complex and entertaining graphical images, animations, and play sequences that cannot be employed in mechanical slot machines. Video-based slot machines do not require any additional hardware for implementing bonus games because the bonus game may be depicted on the primary video display and executed by the same game controller used to execute the video slot game.

Video-based slot machines and mechanical slot machines generally appeal to different segments of the market. Although many players are attracted to the complex and entertaining graphical images, animations, and play sequences afforded by video-based slot machines, many players are still drawn to mechanical slot machines because they are simplistic machines that often only pay on a single pay line and only require a pull of a handle to initiate a spin of the reels. Part of the reason that these players avoid video-based slot machines is that the simulated reels on the video-based machines are different in looks than standard mechanical reels. This is primarily due to the nature of the video screen displaying the images.

It would be beneficial to incorporate some of the features of the video-based slot machines into a traditional mechanical slot machine because of the flexibility that these video-based machines offer. A need exists for a slot machine having video-based capabilities, while still preserving the simplistic rotation of mechanical reels that traditionalists appreciate in the traditional mechanical slot machine. One type of display imposes an image on an underlying display by use of a transmissive liquid crystal display over a window which provides viewing of the underlying display which may be a mechanical reel or a simulated mechanical reel. Such a display system produces a bright front image, but the underlying display is problematic. The current generation of LCD's used to build such a display panel block more than 90% of the light in the window area under the best of conditions. This necessitates a very bright underlying display to project a marginally acceptable image in the window.

SUMMARY

According to one example, a gaming system display is disclosed. The gaming system display includes a projector system projecting a front image associated with a game and a rear image associated with the game at different times. A rear switchable screen is in proximity to the projector system. The rear image is projected on the rear screen at a first time interval. The rear switchable screen has an open state allowing transmittal of light through the rear screen and a closed translucent state obscuring the rear screen. A front switchable screen overlays the rear switchable screen. The projector system projects the front image on the front screen at a second time interval. The front switchable screen has an open state allowing transmittal of light through the front screen and a closed translucent state obscuring the front screen. A controller is coupled to the projector system and front and rear switchable screens to periodically cycle the respective closed and open states between the first and second time intervals to present a juxtaposition of the front image and the rear image to a viewer.

According to another example, a method of juxtaposing a front image associated with a game on a rear image associated with the game on a gaming system display is disclosed. A projector system is positioned relative to a front switchable screen and rear switchable screen. The front switchable screen is switched to a closed translucent state obscuring the front screen during a first time interval. A front image from the projector device is projected on the front switchable screen during the first time interval. The rear switchable screen is switched to an open transparent state allowing the viewing of the front image during the first time interval. The rear switchable screen is switched to a closed translucent state during a second time interval. A rear image is projected from the projector device on the rear switchable screen during the second time interval. The front switchable screen is switched to an open transparent state allowing the viewing of the rear image during the second time interval. The screens are cycled between the first and second time intervals to create a juxtaposition of the front and rear images.

Another example disclosed is a wagering game system including a wagering game controller for operating a wagering game. A wagering game display is coupled to the wagering game controller. The wagering game display includes a projector system projecting a front wagering game image and a rear wagering game image at different times. A rear switchable screen is in proximity to the projector system. The rear wagering game image is projected on the rear screen at a first time interval and the rear switchable screen has an open state allowing transmittal of light through the rear screen and a closed translucent state obscuring the rear screen. A front switchable screen overlays the rear switchable screen. The projector system projects the front wagering game image on the front screen at a second time interval. The front switchable screen has an open state allowing transmittal of light through the front screen and a closed translucent state obscuring the front screen. A display controller is coupled to the projector system and front and rear switchable screens to periodically cycle the respective closed and open states between the first and second time intervals to present a juxtaposition of the front wagering game image and the rear wagering game image to a viewer.

Another example disclosed is a wagering game system display including a projector system projecting a front image relating to a wagering game and a rear image relating to the wagering game at different times. A rear switchable screen has a curved surface and is in proximity to the projector system. The rear image is projected on the rear screen at a first time interval. The rear switchable screen has an open state allowing transmittal of light through the rear screen and a closed translucent state obscuring the rear screen. A front switchable screen overlays the rear switchable screen. The projector system projects the front image on the front screen at a second time interval. The front switchable screen has an open state allowing transmittal of light through the front screen and a closed translucent state obscuring the front screen. A controller is coupled to the projector system and front and rear switchable screens to periodically cycle the respective closed and open states between the first and second time intervals to present a juxtaposition of the front image and the rear image to a viewer.

Another example disclosed is a wagering game system display including a projector system projecting a plurality of wagering game images at different time intervals. A plurality of switchable screens are each in fixed position relative to the projector system. Each of the switchable screens has an open state allowing viewing through the screen and a closed translucent state. A controller is coupled to the projector system and the plurality of switchable screens to periodically cycle the respective closed and open states between the different time intervals to present a juxtaposition of the plurality of wagering game images to a viewer.

Additional aspects will be apparent to those of ordinary skill in the art in view of the detailed description of various embodiments, which is made with reference to the drawings, a brief description of which is provided below.

Figure 1:
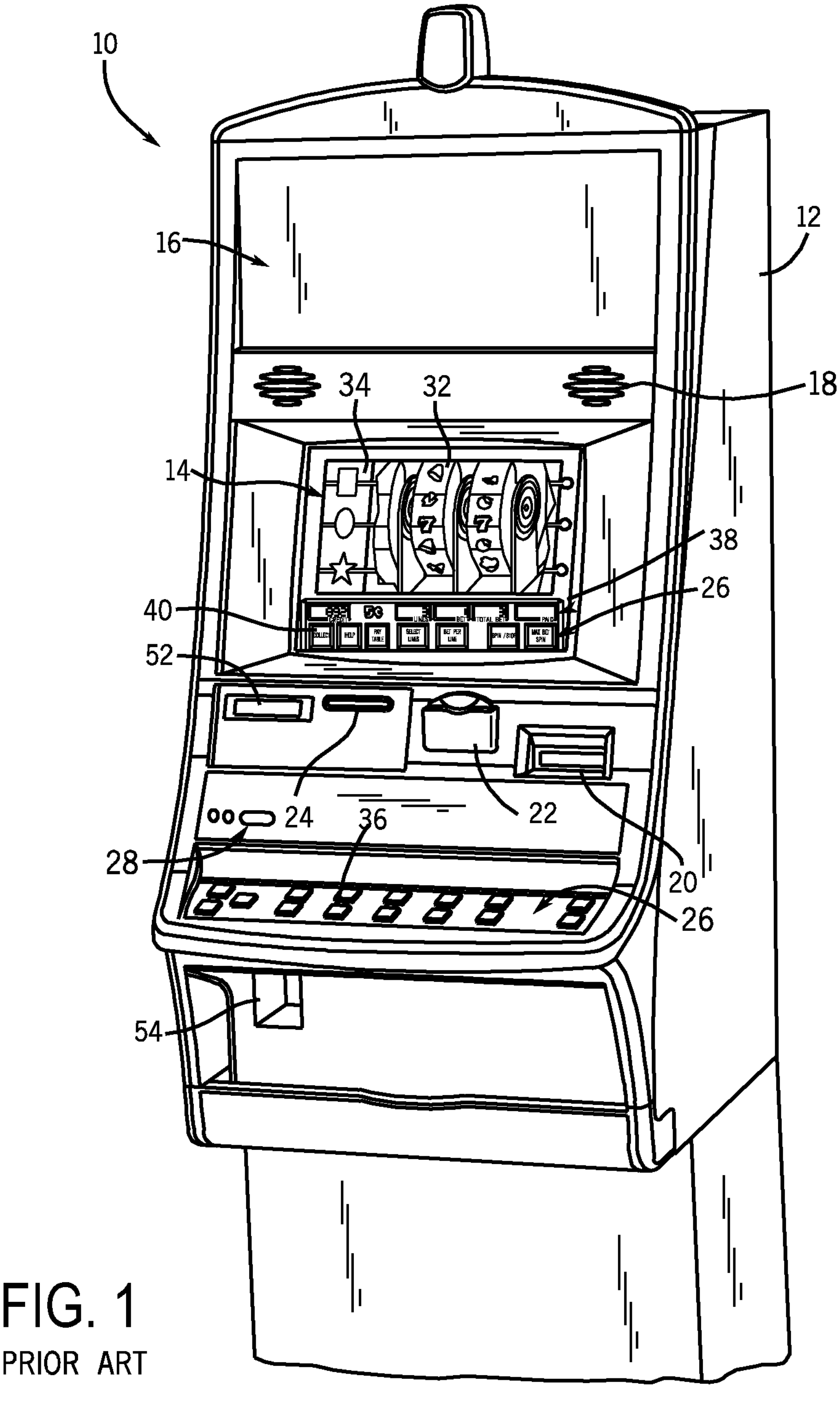
FIG. 1 PRIOR ART
FIG. 1 is a perspective view of a free-standing gaming terminal according to one example.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, the gaming terminal 10 may be an electro-mechanical gaming terminal configured to play mechanical slots, or it may be an electronic gaming terminal configured to play a video casino game, such as slots, keno, poker, blackjack, roulette, craps, etc. It should be understood that although the gaming terminal 10 is shown as a free-standing terminal of the upright type, it may take on a wide variety of other forms such as a free-standing terminal of the slant-top type, a portable or handheld device primarily used for gaming as shown in FIG. 1*b*, a mobile telecommunications device such as a mobile telephone or personal digital assistant (PDA), a counter-top or bar-top gaming terminal, or other personal electronic device such as a portable television, MP3 player, entertainment device, etc.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, e-mails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10. The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only and not the mechanical reels 32, the mechanical reels 32 may be removed from the interior of the terminal and the video display 34 may be of a non-transmissive type. Similarly, if the wagering game conducted via the gaming terminal 10 relies upon the mechanical reels 32 but not the video display 34, the video display 34 may be replaced with a conventional glass panel. The mechanical reels 32 may be replaced with a simulated mechanical reel display such as those described in U.S. Publication No. 2008/0113755 entitled "Wagering Game With Simulated Mechanical Reels Having An Overlying Image Display," U.S. Publication No. 2008/004104 entitled "Wagering Game With Simulated Mechanical Reels" and U.S. Publication No. 2009/0075721 entitled "Wagering Game With Simulated Mechanical Reels" all of which are incorporated herein by reference in their entirety. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Figure 5:
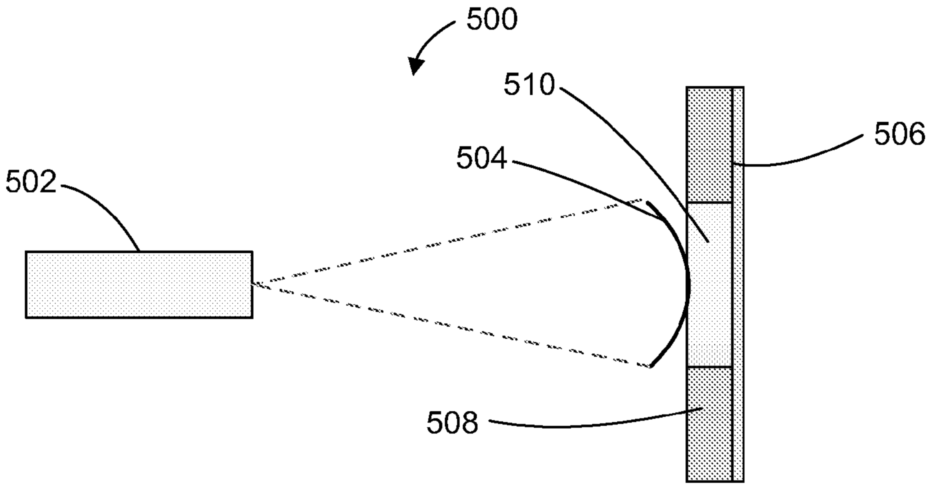
FIG. 5 is a cross-section view of a prior art example of a projection display used with a transmissive LCD.

An example of a simulated reel system 500 where projected images may serve as an underlying simulated mechanical reel display is shown in FIG. 5. FIG. 5 is a cross-section view of the simulated reel system 500. The simulated reel system 500 includes a projector 502, a curved projection screen 504 and a front transparent LCD panel 506. The front transparent LCD panel 506 has a backlight layer 508 that includes an aperture 510. The aperture 510 allows viewing of an underlying display of images projected on the projection screen 504. The simulated reel system 500 allows an underlying display that is the simulated image of mechanical reels created with the projector 502 and a front image on the transparent LCD panel 506 juxtaposed over the underlying display. A significant disadvantage of this approach is that the front LCD panel 506 is only about 5% transmissive at best. The lack of transmissivity severely limits the brightness of the underlying display such as the projected reels on the screen 504.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled "Portable Data Unit for Communicating With Gaming Machine Over Wireless Link," which is incorporated herein by reference in its entirety. The account may be stored at an external system 46 (see FIG. 2) as more fully disclosed in U.S. Pat. No. 6,280,328 to Holch et al. entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

Figure 2:
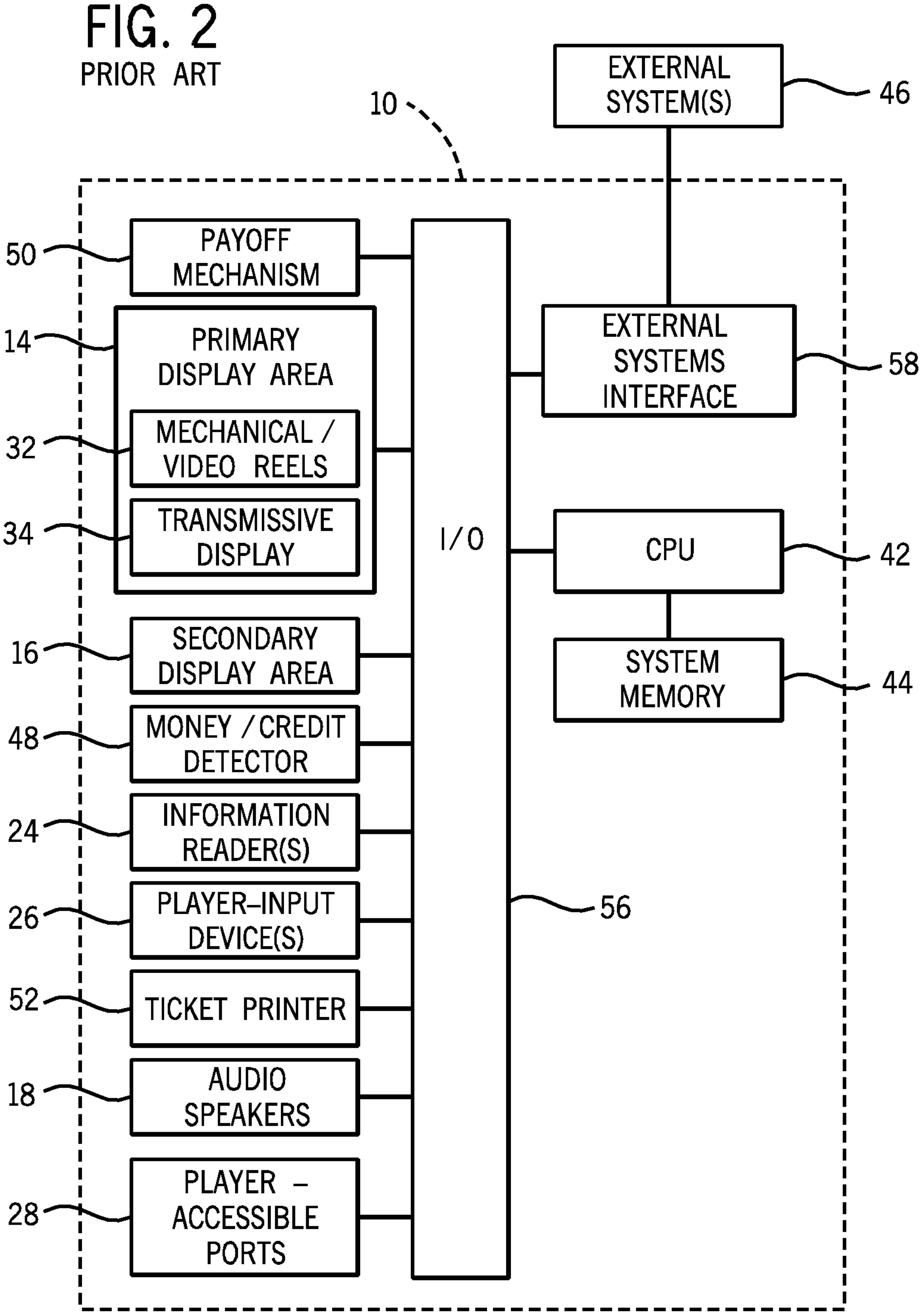
FIG. 2 PRIOR ART
FIG. 2 is a schematic view of a gaming system.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game(s), or via an external game or event. The payoff may be provided in the form of money, redeemable points, services or any combination thereof. Such payoff may be associated with a ticket (from a ticket printer 52), portable data unit (e.g., a card), coins (from a coin outlet 54 shown in FIG. 1), currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10 bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
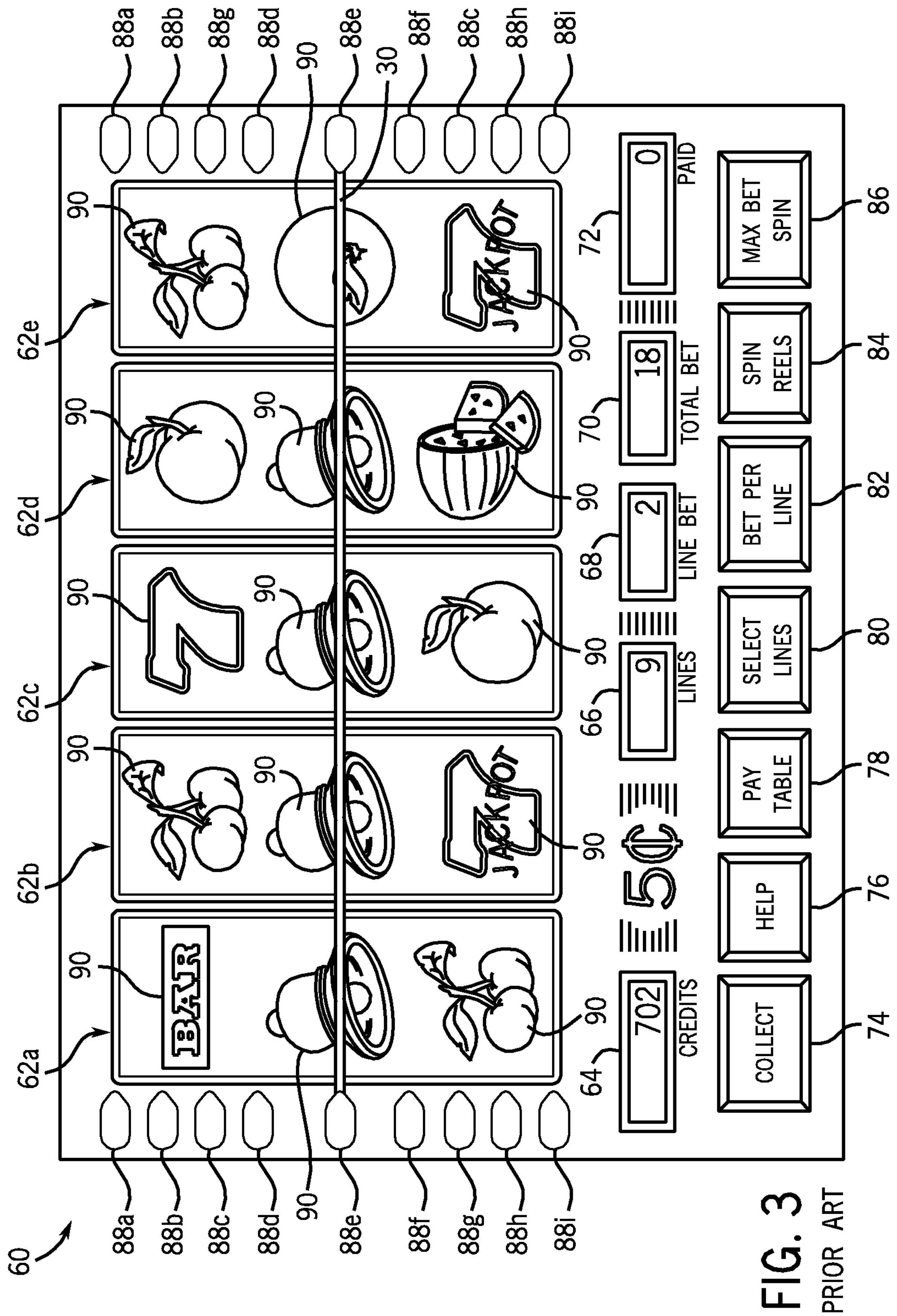
FIG. 3 PRIOR ART
FIG. 3 is an image of a basic-game screen of a wagering game that may be displayed on a gaming terminal.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62*a-e*. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations may be evaluated as line pays or scatter pays. Line pays may be evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown, a gaming terminal with any plurality of reels may also be used in accordance with the present invention.

Figure 4:
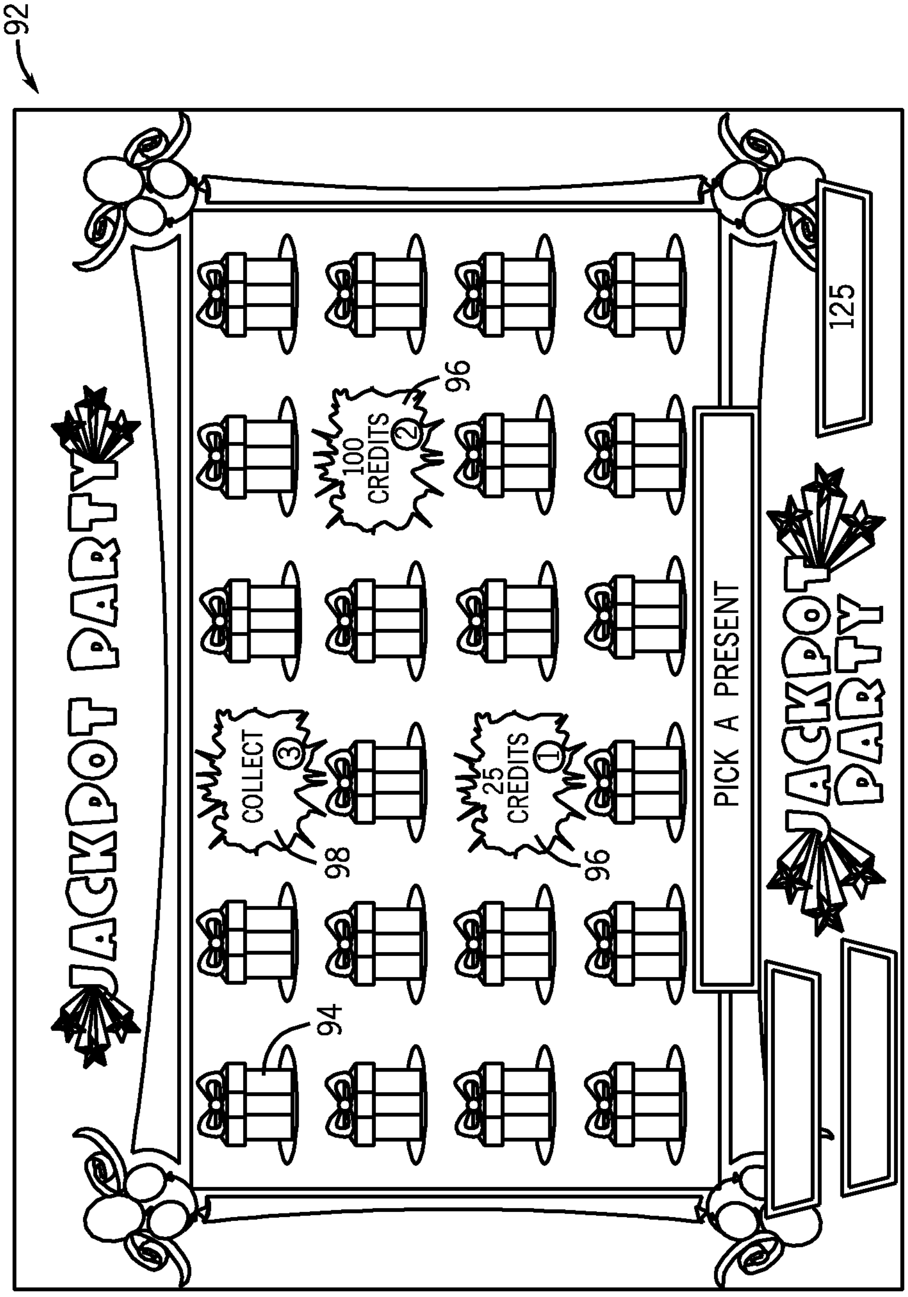
FIG. 4 PRIOR ART
FIG. 4 is an image of a bonus-game screen of a wagering game that may be displayed on a gaming terminal, according to an embodiment of the present invention.

Turning now to FIG. 4, a bonus game that may be included with a basic wagering game is illustrated, according to one embodiment. A bonus-game screen 92 includes an array of markers 94 located in a plurality of columns and rows. The bonus game may be entered upon the occurrence of a special start-bonus game outcome (e.g., symbol trigger, mystery trigger, time-based trigger, etc.) in or during the basic wagering game. Alternatively, the illustrated game may be a stand-alone wagering game.

In the illustrated bonus game, a player selects, one at a time, from the array of markers 94 to reveal an associated bonus-game outcome. According to one embodiment, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 6A:
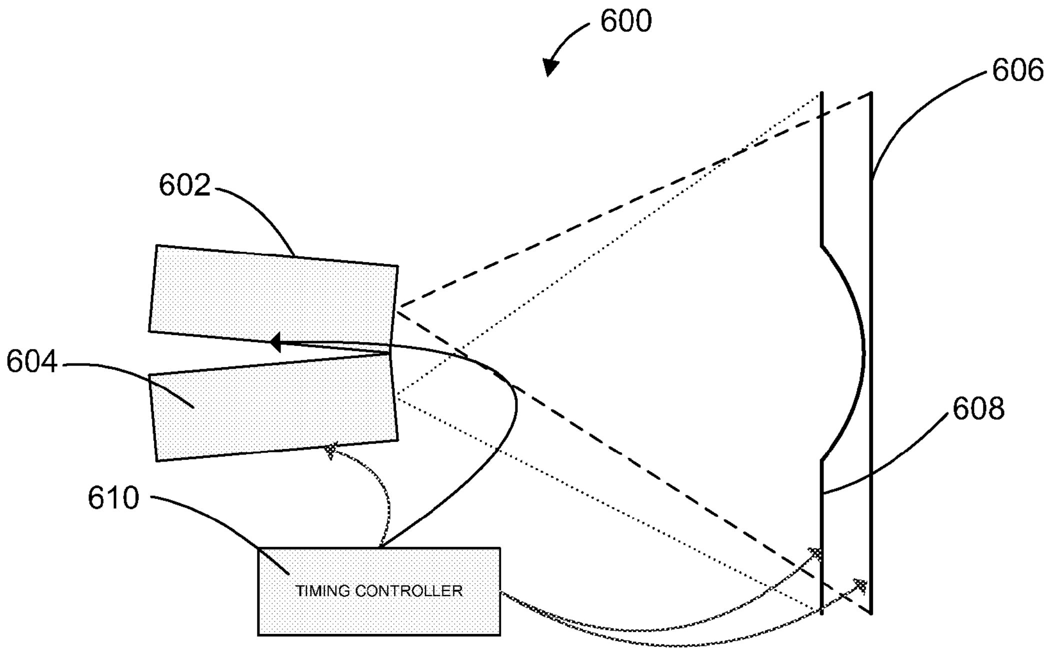
PRIOR ART FIG. 6a
FIG. 6*a* is a cross-section view of a first example of a dual shutter display having dual projectors.

FIG. 6*a* is a cross section view of a dual shutter LCD system 600 that allows the interposition of a front image on a rear image. The dual shutter LCD system 600 has a front projector 602 and a rear projector 604. Corresponding front and rear liquid crystal (LC) shutter screens 606 and 608 each provide a surface for the projection of images from the projectors 602 and 604 respectively. It is not necessary that screens 606 and 608 be flat and parallel to each other. The front shutter screen 606 is shown as a flat surface, while the rear shutter screen 608 has a curved central area which approximates the curved face of a mechanical reel. Other combinations of flat, curved or other shaped screens 606 and 608 are possible for other applications. The front and rear shutter screens 606 and 608 are arranged in parallel to allow a combined display of a rear image and a front image. The projectors 602 and 604 and the screens 606 and 608 are coupled to a controller module 610. The liquid crystal (LC) shutter screens 606 and 608 have a transparent mode allowing transmission of light and a translucent mode that prevents transmission of light that may be voltage controlled. Examples of switchable screens for the switchable LC shutter screens 606 and 608 are available from Pro Display Ltd. of Wakefield, UK or LC-TEC Displays AB, Borlänge, Sweden.

Figure 6C:
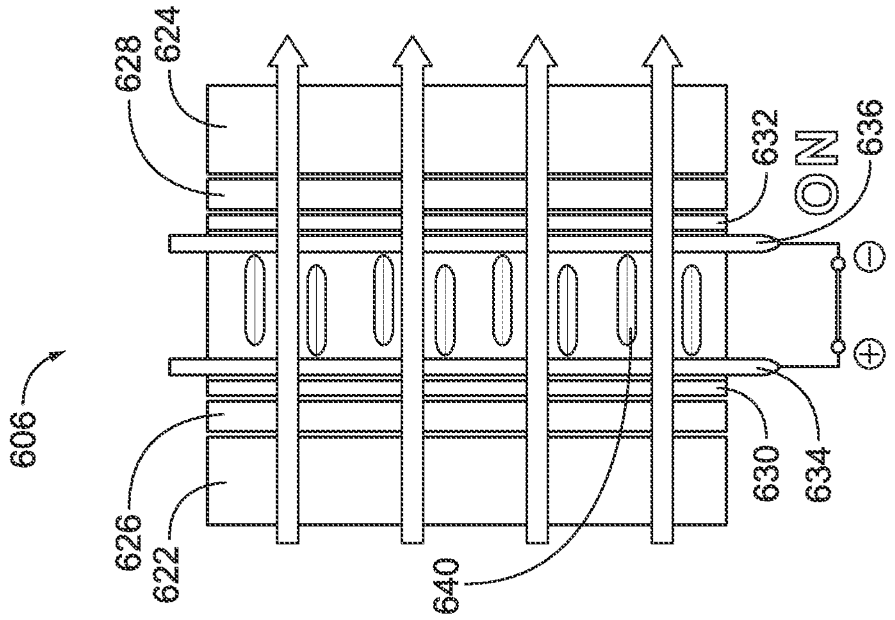
FIGS. 6*b* and 6*c* are cross-section views of the liquid crystal shutter screens of the display in FIG. 6*a*.
Figure 6B:
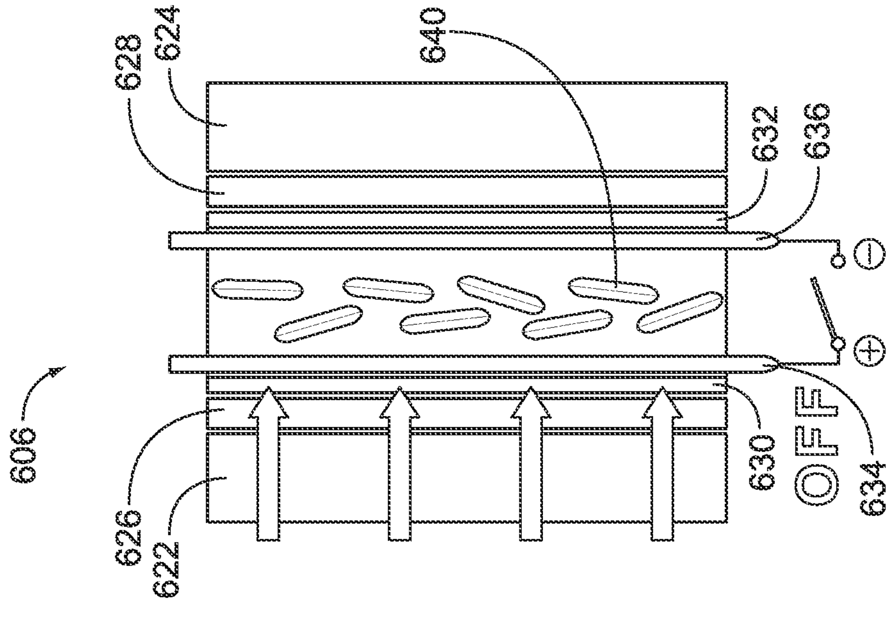

FIGS. 6*b* and 6*c* are cross section views of the front LC shutter screen 606 in FIG. 6*a*. FIG. 6*b* shows the front screen 606 in the translucent mode and FIG. 6*c* shows the front screen 606 in the transparent mode. It is to be understood that the rear LC shutter screen 608 functions in a similar manner as the front LC shutter screen 606. As shown in FIGS. 6*b* and 6*c*, the front LC shutter screen 606 has a rear glass plate 622 and a front glass plate 624, a rear interlayer film 626 and a front interlayer film 628, a rear liquid crystal film 630 and a front liquid crystal film 632, a rear conductive coating 634 and a front conductive coating 636. Liquid crystals 640 are located between the rear conductive coating 634 and the front conductive coating 636.

Without voltage applied to the rear and front conductive coatings 634 and 636 as shown in FIG. 6*b*, the front screen 606 is normally translucent and white in appearance. The liquid crystals 640 are randomly aligned, and scatter the incident light as shown in FIG. 6*b*. The random alignment scattering the light causes a translucent appearance. When in the translucent state the LC shutter front screen 606 makes a suitable projection screen.

When a suitable voltage is applied across the conductive coatings 634 and 636 of the LC shutter front screen 606, the liquid crystals 640 are aligned perpendicularly with the LC shutter front screen 606 allowing incoming light to be transmitted through as shown in FIG. 6*c*. Thus, the LC shutter front screen 606 becomes essentially transparent with voltage applied. The state of the LC shutter front screen 606 can be switched rapidly, in just a few milliseconds, by applying the proper voltage to conductive coatings 634 and 636 of the front screen 606.

In the dual shutter LCD system 600 shown in FIG. 6*a*, the separate projectors 602 and 604 are used to project front and rear images respectively on each of the front and rear screens 606 and 608. In this figure the rear screen 608 is curved to better simulate a mechanical reel when a reel image is projected on it from the rear projector 604. Of course, both screens 606 and 608 could be flat and parallel, or in other combinations of shapes. Only one of the two projectors 602 and 604 is on at a time. The projectors are turned off by either removing power to their illumination source, or by causing the projector to project a totally black image. Removing power requires a projector modification to provide an enable/disable input for the illumination source. Causing the projector to project a black image requires a mechanism for switching the input video signal. This can be done with relatively simple electronic circuitry and has the advantage of utilizing standard projectors. Thus, during a first interval when the front projector 602 is on, a front image is projected on the front screen 606 which is switched to translucent mode. The rear screen 608 is switched to the transparent mode, allowing the front image projected on the front screen 606 to be viewed in the first interval. When the rear projector 604 is turned on, a rear image is projected on the rear screen 608 in the first interval. During a second interval, the front projector 602 is turned off and stops projecting the front image. The rear screen 608 is switched to the translucent mode to allow the projection of the rear image in the second interval. The front screen 606 is switched to the transparent mode to allowing viewing of the rear image projected on the rear screen 608 in the second interval. The projector enable timing signals for controlling the front projector 602 and the rear projector 604 and the LC shutter enable timing for the front screen 606 and the rear screen 608 are coordinated by a timing routine on the controller module 610. The timing diagram for of the various components in the display 600 in FIG. 6*a* during the first and second intervals is shown in the below table.

TABLE 1

Timing Diagram

| Component | INTERVAL 1 | INTERVAL 2 |
|---|---|---|
| Front Projector 602 | On | Off |
| Rear Projector 604 | Off | On |
| Front Screen 606 | Translucent (showing front image) | Transparent |
| Rear Screen 608 | Transparent | Translucent (showing front image) |

In this example, the projection switching between the two projectors 602 and 604 is done sequentially, probably at 15 times per second or faster, fast enough that the eye does not perceive any flicker in the front and rear images. In such a manner, the images projected by the front projector 602 and the rear projector 604 appear to be juxtaposed with each other. Thus, the player will perceive this as a composite of the two images at the same time, with no noticeable flicker. The rear image will be visible through the front image since the front image is only displayed 50% of the time it will appear to be 50% transparent, even when a fully saturated image is being projected on it. To create fully saturated black (for instance), care must be taken to project black (no light) on the rear screen in the desired areas behind the front screen.

The projectors 602 and 604 are enabled and disabled rapidly through an external control signal, shown originating from the controller module 610. In this example, the projectors 602 and 604 use an LED based light source and therefore the required enable signal may be coupled to the light source of the projectors which may be switched rapidly. The controller module 610 also provides the voltage driver signals to the LC shutter screens 606 and 608. The switching from one mode to the other does not need to be synchronous to the input video signals with this approach; the two projectors 620 and 604 may thus be running at different resolutions and frame rates. Using two projectors 602 and 604 will also double the amount of light available to provide a bright image on the display 600.

The superimposed front and rear images presented on the display 600 may serve any number of other functions. For example, the front image presented on the front screen 606 may be used to highlight winning combination(s) (e.g., "7," "7," "7"), associated pay line(s,) and/or depict the award for that winning combination on the rear image on the rear screen 608. Such rear images may simulate a mechanical reel system with various symbols. Alternatively, the front image may appear to obscure all symbols not appearing on an active pay line or not part of a winning outcome when the rear image on the rear screen 608 is a simulated mechanical reel. The front image may further include special effects such as flashing the winning pay line(s) and/or the award and providing desired themed graphics in the mechanical reel mode. In certain examples, the display 600 may be outfitted with a touch screen, and the front image on the front screen 606 portrays touch keys wherein a player can then enable a desired function by touching the touch screen at an appropriate touch key. Thus, the superimposed front image, along with a touch screen, may be used to implement side betting, such as is disclosed in United States Patent Publication No. 2004/0219968 entitled "Gaming Machine with Interactive Pop-Up Windows," which is hereby incorporated by reference in its entirety herein. In some examples, the superimposed front image may provide foreground elements that interact with the rear image on the rear screen 608. The superimposed video image may be used to provide additional games instead of or in addition to interacting with a wagering game display on a primary game display.

Basic wagering games and/or bonus games may also be played, in whole or in part, using the front and rear images on the display. For example, a bonus game may be shown on the front screen 606. Further, the front image may be used to modify one or more symbols on one or more of an image of stopped mechanical reels on the rear screen 608 or to display a symbol over a blank symbol field (i.e., solid white area) on an underlying simulated reel on the rear screen 608.

Figure 7:
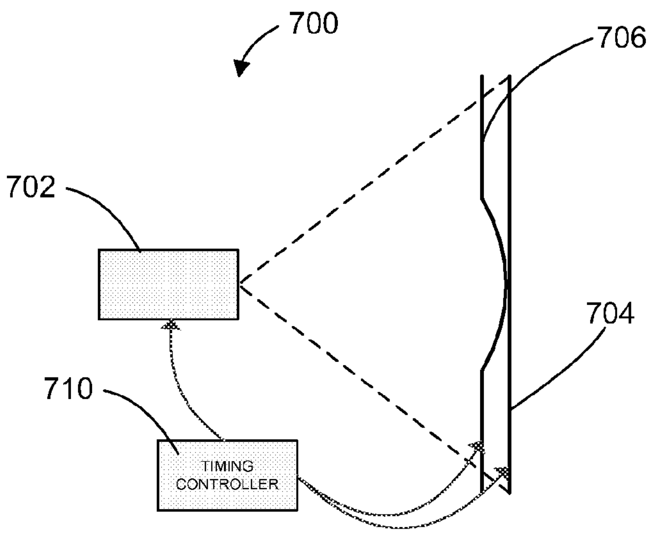
FIG. 7 is a cross-section view of a second example of a dual shutter display having a single projector.

A cross-section view of an alternate dual shutter display 700 is shown in FIG. 7. The dual shutter LCD system 700 has a projector 702 positioned relative to a front liquid crystal (LC) shutter screen 704 and a rear LC shutter screen 706. The projector 702 and the screens 704 and 706 are coupled to a controller module 710. As in the previous example, the liquid crystal (LC) shutter screens 704 and 706 have a transparent mode allowing transmission of light and a translucent mode that prevents transmission of light. The projector 702 is used to project images on the two different screens 704 and 706. In this example, the rear screen 706 is curved to simulate a mechanical reel. However, both screens 704 and 706 could be flat and parallel, or other combinations of shapes. The timing diagram of the various components in the display 700 in FIG. 7 is shown in the below table.

TABLE 2

| Timing Diagram | | |
|---|---|---|
| Component | Interval 1 | Interval 2 |
| Projector 702 | Rear image | Front image |
| Front Screen 704 | Transparent | Translucent (showing front image) |
| Rear Screen 706 | Translucent (showing rear image) | Transparent |

In this example, the projector 702 projects a rear image for the rear screen 706 during a first interval. During the first interval, no voltage is applied to the rear screen 706, so it is translucent and allows the rear image to be seen projected on the rear screen 706. A voltage from the controller 710 is applied to the front screen 704, making it transparent during the first interval. Therefore, during this time interval a player will see the rear image projected onto the rear screen 706.

During the second time interval the projector 702 projects a front image for the front screen 704. In the second time interval, a voltage is applied to the rear screen 706 from the controller 710, making it transparent. This allows the projected front image to pass through undisturbed to the front screen 704, which is now translucent because no voltage is applied to it.

The controller 710 cycles the video signal to the projector 702 and the screens 704 and 706 between the two time intervals. The player will perceive this effect as the front and rear image being shown at the same time on the display 700, with no noticeable flicker. The rear first image will be visible through the front image. Since the front image is only displayed 50% of the time it will appear to be 50% transparent, even when a fully saturated image is being projected on it. To create fully saturated black (for instance), care must be taken to project black (no light) on the rear screen in the desired areas behind the front screen. In this example, the input video at the projector 702 must be switched between the two images without creating image artifacts. This requires that the switching be synchronous with the video refresh rate of the projection device 702, which may be set at 60 Hz.

Figure 8:
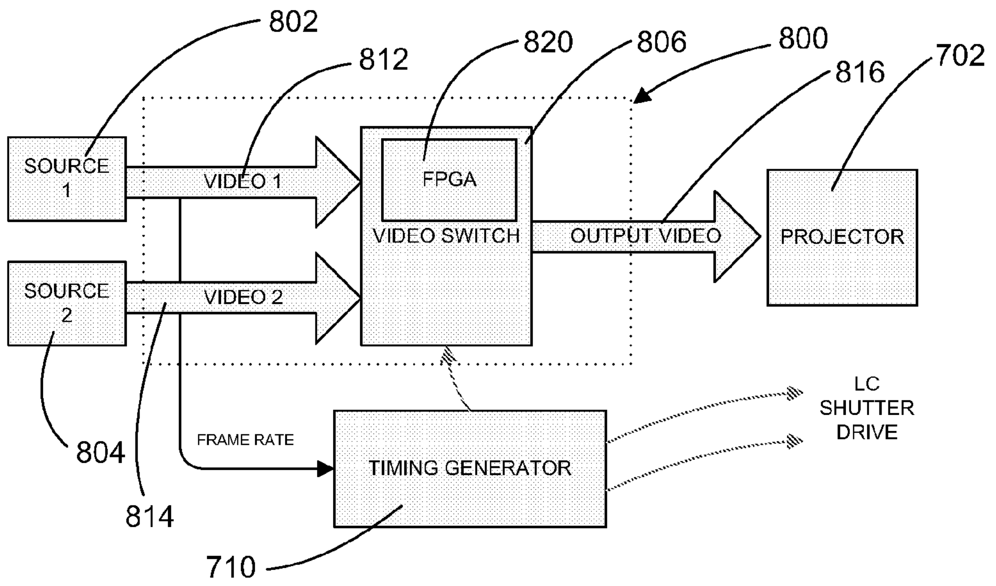
FIG. 8 is a block diagram of a dual video image projector that may be used for the projector in FIG. 7.

One example of providing the proper video signal to the projector 702 in FIG. 7 may be the video device 800 shown in FIG. 8. FIG. 8 is a block diagram of the video device 800 that accepts video input signals from a first video source 802 and a second video source 804 and includes a video switch 806. Each of the video sources 802 and 804 may be video signal output sources such as graphic computers, image processors, etc. The first video source 802 provides image data for the front image on the front screen 704 through a first video stream 812 and the second video source provides image data for the rear image on the rear screen 706 through a second video stream 814. The video switch 806 has dual video inputs coupled to the video sources 802 and 804 and an output video stream 816. The video streams 812 and 814 from the video sources 802 and 804 are transmitted to the dual video inputs of the video switch 806. One or the other video streams 812 or 814 are selected by the video switch 806 to be sent to the output video stream 816. The output video stream 806 is sent to the projector 702. The video switch 806 is controlled through the controller 710, which also controls the signals which enable the LC shutter screens 704 and 706. The timing generator which determines the timing of the switching signal for the video switch 806 gets its timing information from the frame rate data in the incoming video streams 812 and 814 from the video sources 802 and 804. The video switching occurs synchronously with the input video data to avoid image breakup, etc. This requires that the incoming video streams 812 and 814 must be at the same frame rate exactly and in phase. In this example, a dual-head video output card including a field programmable gate array (FPGA) 820 may be used for the video switch 806 which insures the video steams 812 and 814 are at the same frame rate and in phase. The FPGA 820 allows for rapid image processing and switching, ensuring that the video streams 812 and 814 stay in sync with each other. Of course other mechanisms to provide rapid switching such as high-speed analog circuitry may be used.

Figure 9:
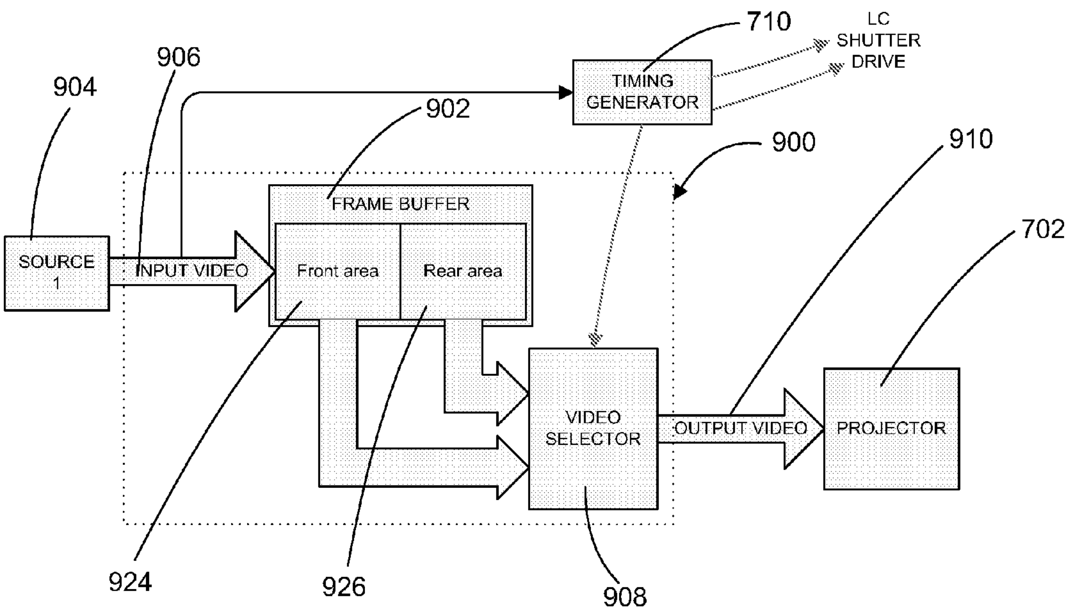
FIG. 9 is a block diagram of an alternative dual video image projector that may be used for the projector in FIG. 7.

FIG. 9 shows an alternate video device 900 which may be used to provide the proper video signal for the projector device 702 in FIG. 7. The projector device 900 has a video buffer 902 that has enough digital storage for twice the image size required for a single image. An input video source 904 writes an incoming video stream 906 to the video buffer 902. In this example, the incoming video stream 906 has two images that are to be projected on the front and rear screens 704 and 706 in FIG. 7. For example, if the images in the incoming video stream 906 are each 800×600 pixels, the video buffer 902 would thus be 1600×600 pixels in order to store two images. In this example, the video buffer 902 has a rear frame area 924 and a front frame area 926 that are used to store the two images from the incoming video stream 906.

A video selector 908 is coupled to the video buffer 902 and may read pixels from the two frame areas 924 and 926. The video selector 908 chooses one half of the video buffer 902 to be sent to an output video stream 910 as part of the timing interval described above to cycle the front and rear images. The output video stream 910 is coupled to the projector 702. The timing from the input video source 904 is extracted by the timing generator in the controller 710 to ensure that the switching between the images does not affect the video quality.

The advantage of this approach is that it only requires one input video stream which generates switching from one input video channel to ensure synchronization. One video stream also reduces the system video requirements.

One of the major benefits of the dual shutter type displays as shown in FIG. 6*a* and FIG. 7 is image brightness. The LC shutters in FIG. 6*a* and FIG. 7 transmit about 85% of the light, either transparent or translucent. Factoring in two LC shutters, and the fact that either screen is translucent 50% of the time gives a light transmission to the user of about 36%. This is an improvement over the best case 10% for the transmissive LCD display in FIG. 5. In addition, this approach allows either screen to be tailored to different size, aspect ratios, shapes, etc.

Each of these embodiments and obvious variations thereof is contemplated as falling within the spirit and scope of the claimed invention, which is set forth in the following claims.

The invention claimed is:

1. A gaming system display comprising:

a projector system projecting a front image associated with a game and a rear image associated with the game at different times;

a rear switchable screen in proximity to the projector system, the rear image being projected on the rear screen at a first time interval and the rear switchable screen having an open state allowing transmittal of light through the rear screen at a second time interval and a closed translucent state obscuring the rear screen at the first time interval;

a front switchable screen overlaying the rear switchable screen, the projector system projecting the front image on the front screen at the second time interval, the front switchable screen having an open state allowing transmittal of light through the front screen at the first time interval and a closed translucent state obscuring the front screen at the second time interval; and a controller coupled to the projector system and front and rear switchable screens to periodically cycle the respective closed and open states of the front and rear switchable screens between the first and second time intervals at a sufficiently high rate to present a juxtaposition of the front image and the rear image to a viewer without flicker between the front image and the rear image.

2. The gaming system display of claim 1, wherein the cycle is repeated more than 60 times a second.

3. The gaming system display of claim 1, wherein the rear screen includes a curved surface having a radius of curvature substantially similar to a mechanical reel.

4. The gaming system display of claim 3, wherein the rear image is a simulated mechanical reel with symbols.

5. The gaming system display of claim 1, wherein the projector system has a front projector to project the front image at the front screen and a rear projector to project the rear image at the rear screen.

6. The gaming system display of claim 1, wherein the projector system includes:

a first video source emitting the rear image, a second video source emitting the front image, a switch coupled to the first and second video source, the switch including a video output, the switch switching between the first and second video source at the video output, and a projector coupled to the output video source to project the output video on the front and rear screens.

7. The gaming system display of claim 6, wherein the switch is implemented in a field programmable gate array (FPGA).

8. The gaming system display of claim 1, wherein the video projector system includes a video buffer including a first image area and a second image area, and a projector directing an image to the front and rear screens, the image being switched between the first area and second area of the buffer.

9. A method of juxtaposing a front image associated with a game on a rear image associated with the game on a gaming system display, the method comprising:

positioning a projector system relative to a front switchable screen and a rear switchable screen;

switching the front switchable screen to a closed translucent state obscuring the front screen during a first time interval;

projecting the front image associated with the game from the projector device on the front switchable screen during the first time interval;

switching the rear switchable screen to an open transparent state allowing the viewing of the front image associated with the game during the first time interval;

switching the rear switchable screen to a closed translucent state during a second time interval;

projecting the rear image associated with the game from the projector device on the rear switchable screen during the second time interval;

switching the front switchable screen to an open transparent state allowing the viewing of the rear image associated with the game during the second time interval; and cycling between the first and second time intervals at a sufficiently high rate to create a juxtaposition of the front and rear images without flicker between the front and rear images.

10. The method of claim 9, wherein the cycle is repeated more than 60 times a second.

11. The method of claim 9, wherein the rear screen includes a curved surface having a radius of curvature substantially similar to a mechanical reel.

12. The method of claim 11, wherein the rear image is a simulated mechanical reel with symbols.

13. The method of claim 9, wherein the projector system includes a video buffer including a first image area and a second image area, and a projector directing an image to the front and rear screens, the image being switched between the first area and second area of the buffer.

14. A wagering game system comprising:

a wagering game controller for operating a wagering game; and a wagering game display coupled to the wagering game controller, the wagering game display including:

a projector system projecting a front wagering game image and a rear wagering game image at different times;

a rear switchable screen in proximity to the projector system, the rear wagering game image being projected on the rear screen at a first time interval and the rear switchable screen having an open state allowing transmittal of light through the rear screen at a second time interval and a closed translucent state obscuring the rear screen at the first time interval;

a front switchable screen overlaying the rear switchable screen, the projector system projecting the front wagering game image on the front screen at the second time interval, the front switchable screen having an open state allowing transmittal of light through the front screen at the second time interval and a closed translucent state obscuring the front screen at the first time interval; and a display controller coupled to the projector system and front and rear switchable screens to periodically cycle the respective closed and open states between the first and second time intervals at a sufficiently high rate to present a juxtaposition of the front wagering game image and the rear wagering game image to a viewer without flicker between the front and rear wagering game images.

15. The gaming system of claim 14, wherein the rear screen includes a curved surface having a radius of curvature substantially similar to a mechanical reel wherein the rear image is a simulated mechanical reel with symbols.

16. The gaming system of claim 14, wherein the projector system includes:

a first video source emitting the rear image, a second video source emitting the front image, a switch coupled to the first and second video source, the switch including a video output, the switch switching between the first and second video source at the video output, and a projector coupled to the output video source to project the output video on the front and rear screens.

17. A wagering game system display comprising:

a projector system projecting a front image relating to a wagering game and a rear image relating to the wagering game at different times;

a rear switchable screen having a curved surface in proximity to the projector system, the rear image being projected on the rear screen at a first time interval and the rear switchable screen having an open state allowing transmittal of light through the rear screen at a second time interval and a closed translucent state obscuring the rear screen at the first time interval;

a front switchable screen overlaying the rear switchable screen, the projector system projecting the front image on the front screen at the second time interval, the front switchable screen having an open state allowing transmittal of light through the front screen at the first time interval and a closed translucent state obscuring the front screen at the second time interval; and a controller coupled to the projector system and front and rear switchable screens to periodically cycle the respective closed and open states between the first and second time intervals at a sufficiently high rate to present a juxtaposition of the front image and the rear image to a viewer without flicker between the front and rear images.

18. The wagering game system display of claim 17, wherein the rear screen includes a curved surface having a radius of curvature substantially similar to a mechanical reel and wherein the rear image is a simulated mechanical reel with symbols.

19. The wagering game system display of claim 17, wherein the front image includes images related to a bonus game.

20. A wagering game system display comprising:

a projector system projecting a plurality of wagering game images at different time intervals;

a plurality of switchable screens each in fixed position relative to the projector system, each of the switchable screens having an open state allowing viewing through the screen and a closed translucent state obscuring viewing through the screen, the switchable screens each being in front of the projector; and a controller coupled to the projector system and the plurality of switchable screens to periodically cycle the respective closed and open states between the different time intervals to project a juxtaposition of the plurality of wagering game images to a viewer at a sufficiently high rate without flicker between the plurality of wagering game images, wherein during each time interval, one of the plurality of wagering game images is projected on a corresponding first one of the plurality of switchable screens in the closed state while a second one of the plurality of switchable screens is in the open state.

* * * * *